United States Patent [19]

Halter

[11] Patent Number: 5,110,518
[45] Date of Patent: May 5, 1992

[54] FOIL-BLOWING APPARATUS AND METHOD

[75] Inventor: Hartmut Halter, Troisdorf, Fed. Rep. of Germany

[73] Assignee: Reifenhauser GmbH & Co. Maschinenfabrik, Troisdorf, Fed. Rep. of Germany

[21] Appl. No.: 598,392

[22] Filed: Oct. 16, 1990

[30] Foreign Application Priority Data

Oct. 26, 1989 [DE] Fed. Rep. of Germany ....... 3935701
Apr. 27, 1990 [DE] Fed. Rep. of Germany ....... 4013610

[51] Int. Cl.⁵ .................... B29C 47/16; B29C 47/92
[52] U.S. Cl. ................... 264/40.1; 264/209.8; 264/211.12; 264/564; 425/141; 425/162; 425/326.1; 425/377; 425/381; 425/466
[58] Field of Search ............. 264/40.1, 40.2, 40.5, 264/40.7, 209.2, 209.8, 211.12, 564; 425/72.1, 135, 141, 162, 326.1, 381, 377, 466

[56] References Cited

U.S. PATENT DOCUMENTS

| | | | |
|---|---|---|---|
| 3,988,582 | 10/1976 | Harman | 425/72.1 X |
| 4,339,404 | 7/1982 | Upmeier et al. | 264/40.1 |
| 4,351,785 | 9/1982 | Upmeier et al. | 264/40.1 |
| 4,594,063 | 6/1986 | Reifenhauser et al. | 425/141 |
| 4,741,686 | 5/1988 | Cazzani et al. | 425/381 |

FOREIGN PATENT DOCUMENTS

| | | |
|---|---|---|
| 2950003 | 8/1983 | Fed. Rep. of Germany . |
| 3002903 | 12/1983 | Fed. Rep. of Germany . |
| 3427915 | 3/1986 | Fed. Rep. of Germany . |
| 1279158 | 2/1961 | France ................. 425/381 |

Primary Examiner—Leo B. Tentoni
Attorney, Agent, or Firm—Herbert Dubno

[57] ABSTRACT

A foil-blowing apparatus has at least one deformable lip defining the annular orifice from which the thermoplastic tube which is blown to form the coil is extruded. The lip can be provided with an array of effectors which, in response to a thickness-profile measuring unit, can radially deform the lip to correct thickness errors. The lip can be under prestress and the radial deformation is effected by measuring the thickness and superimposing a radial force on the prestress.

15 Claims, 4 Drawing Sheets

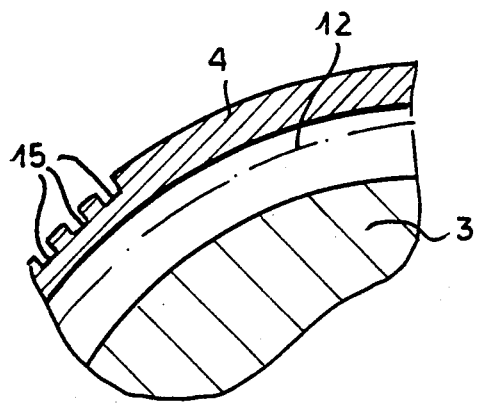
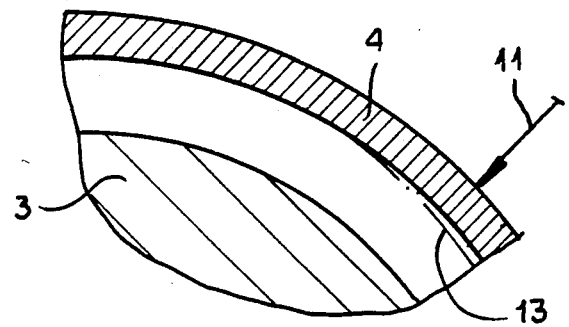
FIG 2A  FIG.2B
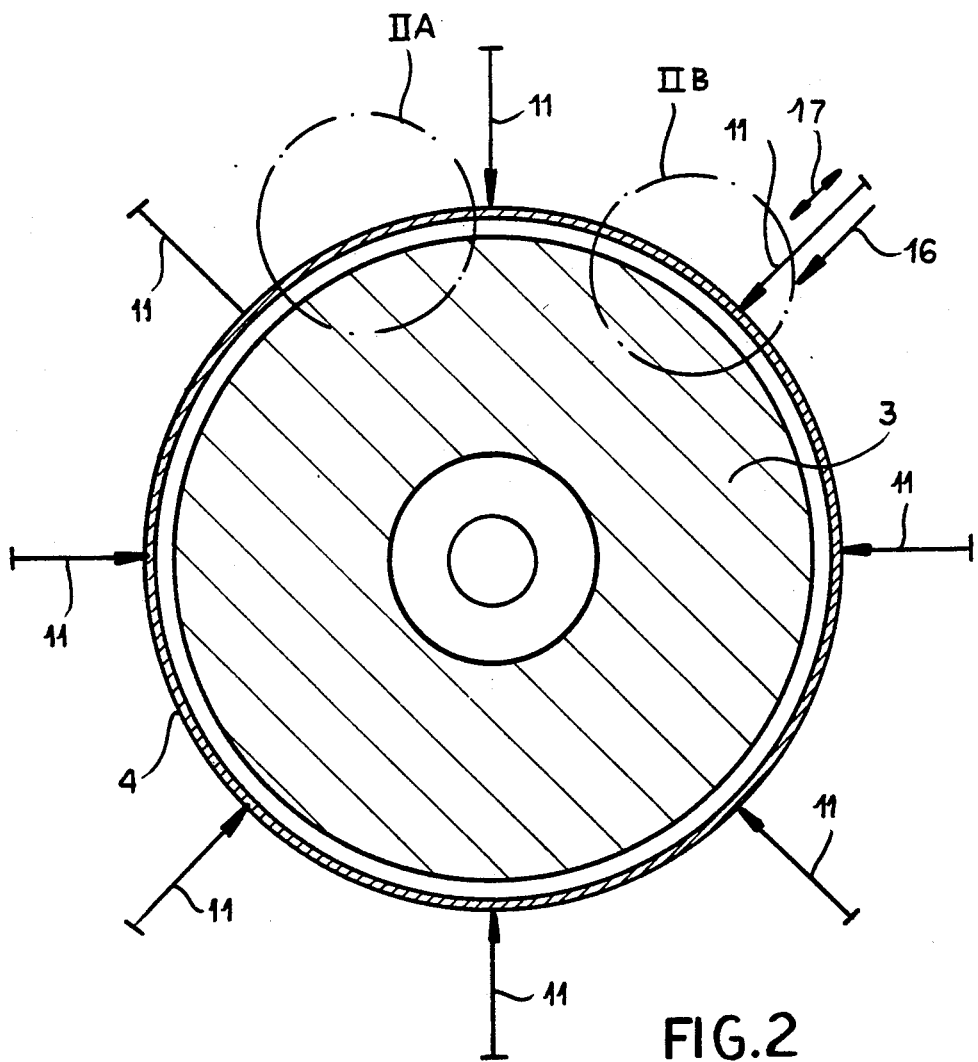
FIG.2

FOIL-BLOWING APPARATUS AND METHOD

FIELD OF THE INVENTION

My present invention relates to a foil-blowing apparatus and method. More particularly, the invention relates to a method of operating a blown film extruder apparatus for the production of a synthetic resin (plastic) foil or thermoplastic material, to a method of foil blowing for producing foils of thermoplastic material with improved uniformity, and to an apparatus for carrying out the latter method or for operation by the earlier method.

Specifically the invention relates to the type of apparatus in which an extruder is provided with a blowing head and the blowing head has an annular nozzle from which a tube of the thermoplastic material is extruded so that this tube can be blown to form a balloon whose wall thickness corresponds to the thickness of the foil or film desired and which is a small fraction of the wall thickness of the extruded tube.

The balloon is collapsed at a location remote from the extruder and a double-layer web or single-layer web of the foil is coiled in a roll.

BACKGROUND OF THE INVENTION

A foil-blowing apparatus of the above-described type generally comprises an annular nozzle defined by an inner and/or outer closed annular lip, frequency referred to hereinafter as an annular gap nozzle lip, of metal from which a thermoplastified synthetic resin emerges, as well as a device for blowing the foil tube thus formed.

The blown foil balloon is continuously flattened to form a web of the foil which can be rolled up in the form of a double-layer web or flattened tube, or with appropriate slitting in the tube, in the form of two single-layer web.

Thickness errors in the plastic foil arise because of various effects. For example, such errors can arise where the structural elements forming the annular-gap orifice are not perfectly circular or are not ideally concentric with one another as a result of fabrication problems. Thickness errors can also arise because of temperature gradients in the foil tube, different mass distributions in the extruding of material from the orifice and like effects.

Thickness error correction is desirable because the further processing of plastic foils generally requires foils with narrow thickness tolerances, i.e. high thickness uniformity across the width and length of the web.

For example, should there be thickness variations, the foil cannot be satisfactorily wound up into a coil or roll or will be wound into a roll which is irregular and thus deviates from a cylindrical contour to a point that the roll cannot be handled easily.

It will be understood, of course, that thickness correction in the region of the orifice will have a significant effect on the thickness of the blown foil and thus it is desirable to effect such a thickness correction immediately upstream of the expansion of the tube to form the foil. The enable a thickness correction, a corresponding measurement of the thickness of the blown foil, in its balloon or bubble, or upstream of the coiling of the foil, or even by monitoring the contour of the coil, can be effected.

In earlier processes (see German patent documents DE 29 50 003 and DE 30 02 903, for example,) the thickness-error correction utilizes temperature-dependent rheological properties of the foil tube. For example, a thickness correction can result from localized or regional heating or cooling in the region of the nozzle. For this purpose, the blowing head in the region of the nozzle may be subdivided into a multiplicity of controlled temperature sectors which are controlled in response to the measurement of a thickness-error profile via a computer.

While this technique is satisfactory in correcting thickness errors, it has drawbacks because it affects detrimentally the optical quality of the foil which is produced.

Clearly, therefore, improvements are required in correction of thickness errors to avoid this drawback.

It has been recognized that it is also necessary, in the case where there may be residual errors, to distribute these errors throughout the periphery of the foil so as to avoid nonuniformity contours of the coil. This can be achieved according to prior art techniques by either imparting to the blowing head a periodic angular oscillation and/or by correspondingly moving the flattened device periodically. As a result, thickness errors will not accumulate at one part of the coil to produce an irregular cooling pattern.

OBJECTS OF THE INVENTION

It is the principal object of the present invention to provide an improved method of operating a film or foil-blowing apparatus of the general type described so as to improve the thickness uniformity of the product and ensure a cylindrical configuration of the web roll without the necessity of angular oscillating or rotating the blowing head.

Another object of the invention is to provide a method of film or foil blowing which permits a more precise control of the foil thickness.

Still another object of the invention is to provide an improved apparatus for the blowing of foil from thermoplastic material whereby drawbacks of earlier systems can be avoided and in a relatively simple manner an accurate control of the thickness of the blown foil can be ensured.

SUMMARY OF THE INVENTION

These objects and others which will become apparent therein-after are attained, in accordance with the invention, by providing an elastically-deformable annular gap nozzle lip, generally of metal, which is under prestress in a radial direction and which is subjected to elastic deformation in response to a thickness measurement on the foil (i.e. on the foil itself or from the contour of the roll or coil) to effect local radial changes in the position of the lip and thereby compensate for thickness errors.

In accordance with one aspect of the invention, therefore, the method of blowing a foil of thermoplastic material comprises the steps of:

(a) extruding a tube of the thermoplastic material continuously from an annular nozzle orifice;

(b) forming at least one annular wall of the orifice as an elastically deformable annular nozzle lip;

(c) blowing the thermoplastic tube extruded form the orifice to expand the tube into a foil balloon;

(d) flattening the foil balloon;

(e) winding at least one layer of foil formed by flattening the foil balloon into a roll of the foil;

(f) measuring a thickness of the foil; and (g) radially deforming the lip in response to the measurement of thickness of the foil in step (f) at a multiplicity of locations around the periphery of the lip to correct a wall thickness of the tube and correct for thickness deviations of the foil.

According to another aspect of the invention, the method is a method of operating a film-blowing apparatus having an annular nozzle orifice through which a tube of the thermoplastic material is extruded continuously, the extruded tube is blown to form the foil and the foil is flattened to produce at least one web of the foil which is coiled in a roll, the method comprising the steps of:

(a) providing the orifice so that it is defined by at least one annular elastically deformable orifice lip;

(b) providing in spaced relationship around the orifice a multiplicity of positioning elements acting upon respective locations of the lip for substantially radially deforming same;

(c) measuring a thickness of the foil; and (d) energizing the positioning elements in response to the measurement of the thickness of the foil to radially deform the lip selectively in response to the measurement of thickness of the foil selectively at the locations around the periphery of the lip to correct a wall thickness of the tube and correct for thickness deviations of the foil.

From an apparatus point of view, the apparatus can comprise:

an extruder formed with an annular nozzle orifice through which a tube of a thermoplastic material is extruded continuously;

means for blowing the thermoplastic tube extruded from the orifice to expand the tube into a foil balloon;

means for flattening the foil balloon;

means for winding at least one layer of foil formed by flattening the foil balloon into a roll of the foil the orifice being defined by at least one annular elastically deformable orifice lip;

a multiplicity of positioning elements in spaced relationship around the orifice acting upon respective locations of the lip for substantially radially deforming same;

means for measuring a thickness of the foil; and means for energizing the positioning elements in response to the measurement of the thickness of the foil to radially deform the lip selectively in response to the measurement of thickness of the foil selectively at the locations around the periphery of the lip to correct a wall thickness of the tube and correct for thickness deviations of the foil.

Preferably the invention operates with an elastically-deformable outer annular gap nozzle lip, because the positioning elements can be more readily distributed around the periphery of the lip in that case. Especially with blowing heads with annular orifices of large diameter, I can use an elastically-deformable inner orifice lip. A combination of both inner and outer elastically-deformable lips each provided with a respective array of positioning elements can be used as well.

In all cases, with a sufficiently precise direct or indirect measurement of the thickness-error profile of the foil, utilizing the correction around the entire inner or outer periphery of the thermoplastic tube, it is possible to produce uniform thickness foils without the back and forth rotation of the blowing head and/or the flattening device and nevertheless obtain a coil or roll with a highly precise cylindrical contour.

The thickness-error measurement can utilize any conventional technique. For example, I can carry out a direct thickness-error measurement on the plastic foil with throughgoing irradiation. I can also employ a temperature measurement of the foil in the region immediately downstream of the nozzle since the temperature at various locations along the foil does reflect the thickness of the foil at these locations.

It is also possible as has been indicated to measure the contour of the coil or foil which is formed and to effect a thickness-error correction upon deviation of the shape of the coil or roll from the predetermined cylindrical contour. In all cases, computer-supported measurement and control means may be provided for this purpose.

In accordance with the invention, therefore, a multiplicity of positioning elements, for example 50 to 100 positioning elements, can be distributed around the inner or outer peripheries of the nozzle and can be coupled to a respective elastically-deformable nozzle lip. The outer nozzle lip is prestressed by a compressive prestress whereas the inner nozzle lip is prestressed by a tension prestress.

In either case, the prestressed lip or the prestressed lips are engaged by the positioning elements in a support arrangement analogous to that of contour beam statics so that the radial correction can be superimposed upon the prestress to deform the lip locally in a positive or negative manner, i.e. to one side or an opposite side of the position determined by the prestress.

The positioning elements themselves can be energized individually or in groups, i.e. in a groupwise manner differently as may be required by the thickness-correction profile.

A variety of kinds of positioning elements may be used. In the simplest case, screws or spindles may be employed which can be adjusted by hand in response to the measurement or by servomotors or the like automatically.

Preferably, however, positioning elements are employed which can be utilized directly as effectors in corresponding control or regulating circuits.

In a preferred embodiment of the invention, the positioning elements are piezoelectric elements and the prestress is generated by applying a starting or initial voltage (bias voltage) to these elements upon which the correction signal, also in the form of voltage, is superimposed.

For symmetry, it is preferred that identical positioning elements be provided all along the respective lip an that these be equidistantly distributed or spaced.

It is known to employ such positioning elements in calibrating units for establishing a particular diameter of pipe in, for example, German patent document DE 34 27 915, but in such systems, there is no suggestion of any relationship between the energization of the positioning elements and the thickness of a blown foil.

The relationship between the excitation of the positioning elements and the thickness correction for a particular excitation, can be ascertained experimentally and empirically without difficulty. It is, however, possible to carry out a precise computer analysis with the aid of modern theoretical mechanics for this purpose using finite-element analysis.

It will be self-understood that the deformations which ar effected by the positioning elements are very small, i.e. in the micrometer range. Nevertheless these deformations suffice for all of the thickness corrections which are required in such foil-blowing systems. In general the nozzles should be so constructed that a deformation possibility of up to 200 micrometers exists which, in the case of an orifice width of about one millimeter, will allow a 20% effect on the thickness tolerances.

BRIEF DESCRIPTION OF THE DRAWINGS

The above and other objects, features and advantages of the present invention will become more readily apparent form the following description, reference being made to the accompanying drawing in which:

FIG. 2 is a cross-sectional view taken along the line II—II of FIG. I;

FIG. 2A is a detail view of the region IIA of FIG. 1;

FIG. 2B is a detail view of the region IIB of FIG. 2;

SPECIFIC DESCRIPTION

Figure 1:
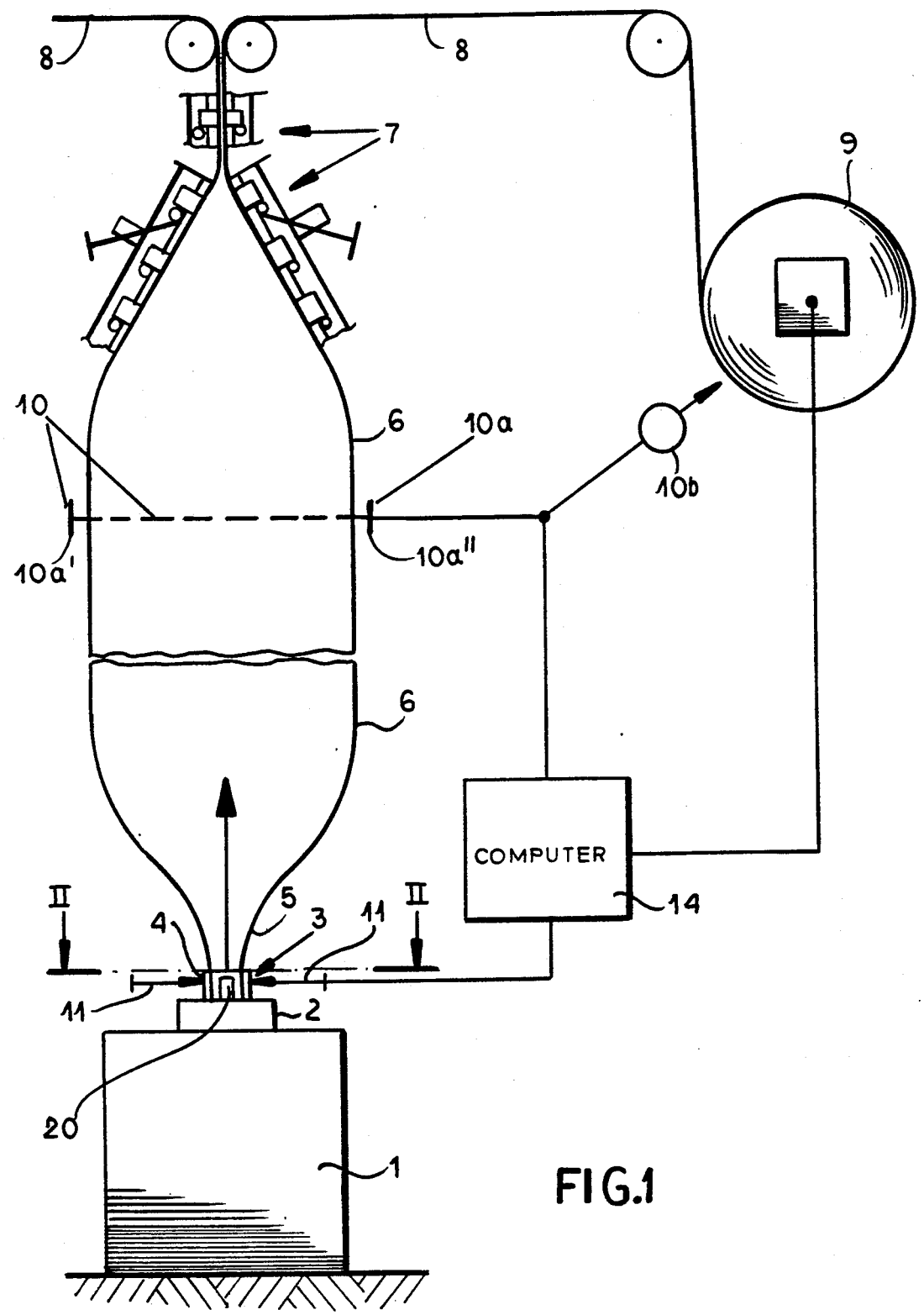
FIG. 1 is a diagrammatic elevational view of an apparatus provided with the thickness-correction modality according to the invention.

The blown-foil extruder shown in FIG. 1 serves to produce a synthetic-resin foil from a thermoplastic synthetic resin, e.g. polyethylene.

The blowing head and extruder assembly comprise an extruder 1 and a blowing head 2. In the blowing head 2, there is formed a circular annular nozzle for orifice 3 defined between a pair of circumferentially-extending lips including an outer lip 4 which can be composed preferably of steel.

The annular gap nozzle 3 is designed to extrude a thermoplastic foil tube 5. The nozzle also comprises a device represented generally at 20 for blowing the foil tube to a foil bubble or balloon 6 which is simultaneously subjected by the compressed air serving as the blowing air to an internal cooling. In the blowing operation, the wall thickness of the tube is substantially reduced to the thickness of a foil.

The upper end of the balloon 6 is closed by a flattening unit 7 of conventional design which can be associated with a slitter so that two thermoplastic foil webs 8 are formed. Only the right-hand foil web 8 has been illustrated in detail in FIG. 1.

The foil webs are wound upon the coils, e.g. coil 9 for the right-hand web, to have a perfectly cylindrical configuration.

According to the invention, a sensor 10a serves to measure the thickness-error profile of the blown balloon by monitoring the contour of the roll 9. In addition, a radiation-type sensor arrangement is represented at 10a for the sensor 10 can be provided to detect the wall thickness of the balloon directly. The sensor may comprise a radiation source 10a and a radiation detector 10a" which can be rotated around the balloon.

The outputs of the measuring device 10a, 10b of the measuring unit 10 can be supplied to a computer 14 to operate effectors or positioning elements 121 controlling the radial deforming of the lip 4 as will be described in greater detail below.

Turning to FIG. 2, it can be seen that a multiplicity of positioning elements 11 can be uniformly spaced and distributed around the lip 4 as represented by representative arrows.

The orifice lip 4 is deformable and the deformability limit is represented in FIG. 2A by the dot-dash line 12.

In FIG. 2B I have shown the selective deformation brought about by one of the effectors or positioning elements 11. That deformation is represented by the dot-dash line 13.

The deformation is effected against a prestress such that the width of the gap forming he orifice is increased or decreased.

To generate the prestress, the multiplicity of positioning elements distributed around the lip 4 can all be excited by a biasing voltage or some other biasing input.

According to the invention, therefore, the device is 10a and 10b for measuring the thickness-error profile work through the computer 14 upon the positioning elements 11.

The lip 4 can be provided with formations such as the grooves 15 which extend axially and serve to increase the deflectability of the lip by the positioning elements 11.

According to a feature of the invention, the positioning elements 11 are piezoelectric positioning elements or effectors which are provided with a predetermined electrical starting voltage providing the bias and prestressing the lip 4. This pressure prestress is effective in the radial direction and is represented by the inwardly-directed arrow 16 in FIG. 2. Thickness-error correction is effected by applying a voltage which can be superimposed upon the bias voltage and can be either positive or negative as is represented by the double-headed arrow 17. The resulting deformations of the lip provide the thickness-error corrections.

Figure 3A:
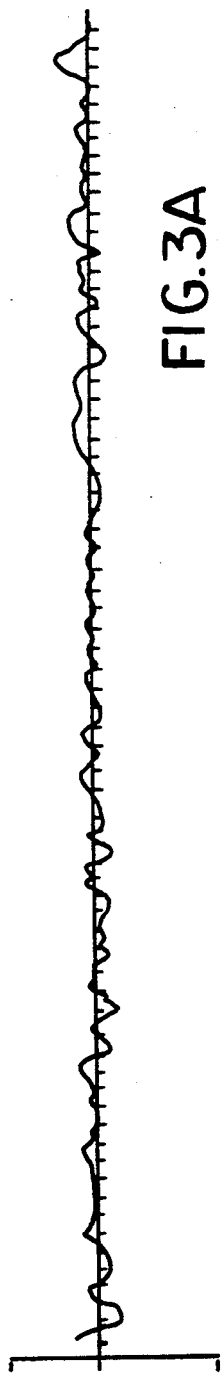
FIGS. 3A, 3B and 3C are graphs illustrating the invention.
Figure 3B:
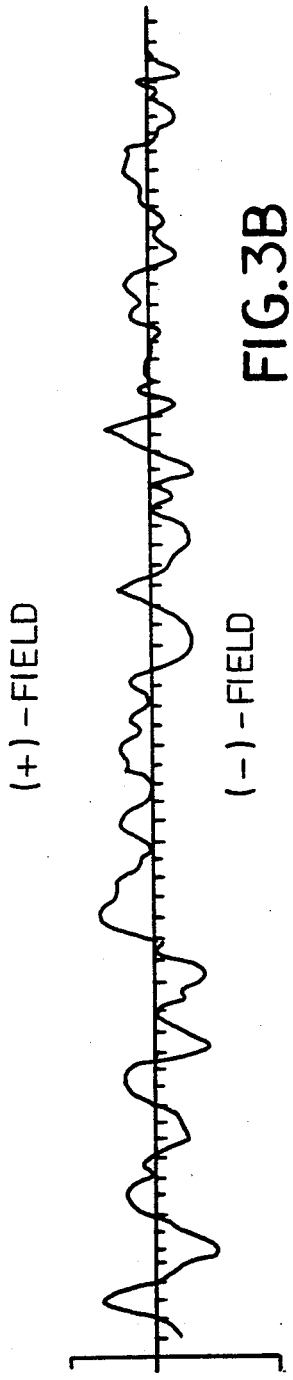
Figure 3C:
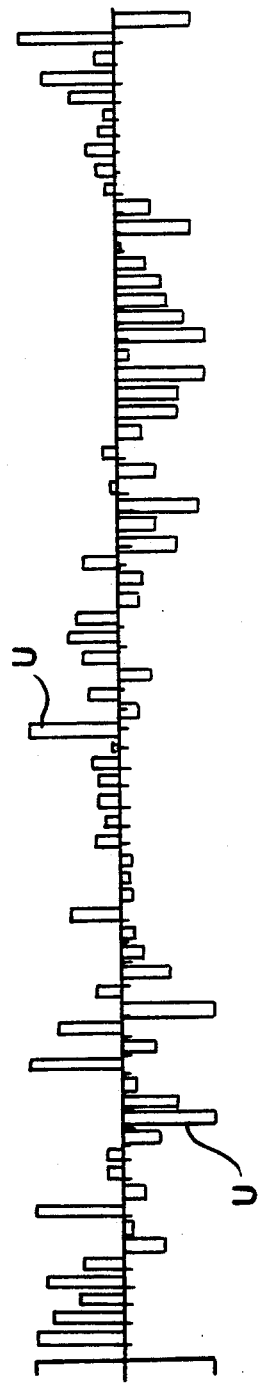

In FIGS. 3A-3C, I have shown graphs in which the abscissa in each cases represents the length along the lip 4 in developed form. Along the lip 4 there is provided a multiplicity of the piezoelectric positioning elements 11, i.e. a number of which can be far greater than the number illustrated, e.g. between 50 and 100.

In FIG. 3B, I have shown the thickness variations in a foil over the circumference of the balloon 6 in the absence of the thickness correction afforded by the instant invention.

In FIGS. 3A and 3B, the variation in thickness is shown in percent of total thickness. In FIG. 3C the correction voltages applied to each effector or positioning element 11 can be seen along the periphery of the lip and the magnitude of this volts is represented along the ordinate.

As can be seen also in FIG. 3B, the variations in thickness can lie to either side of the zero line or abscissa which represents zero error. The error can be considered to die in a plus field or a minus field depending upon whether the thickness exceeds or is less than the predetermined or set-point thickness, respectively. When corrections are supplied as shown in FIG. 3C, the thickness errors can be reduced to insignificant levels as represented diagrammatically, for instance, in FIG. 3A.

Figure 4:
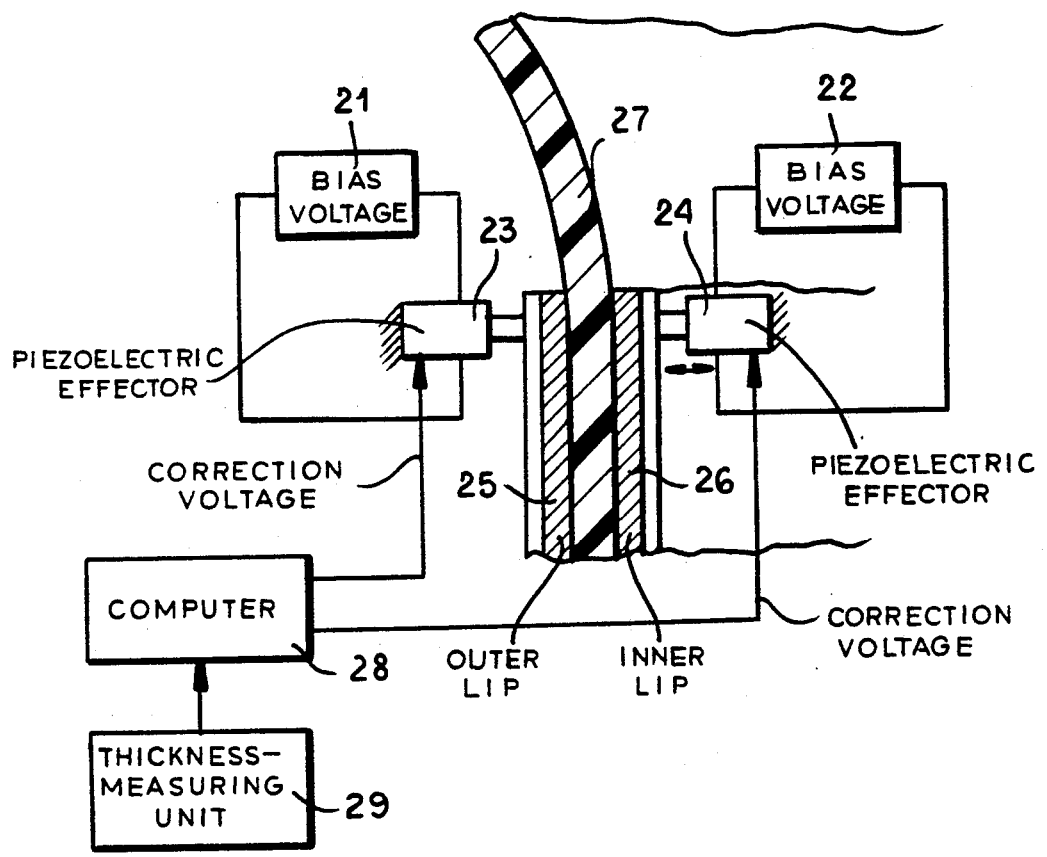
FIG. 4 is a diagrammatic cross-sectional view providing a further illustration of the principles of this invention.

From this Figure, it can be readily seen that both the plus field and minus field errors have been substantially reduced or eliminated. The voltages U for the piezoelectric effectors or position sensors can be superimposed on the bias voltages from the sources 21 and 22 for the position sensors 23 and 24 for the two deformable lips 25, 26 of the orifice 27 in the embodiment of FIG. 4.

The correction voltages represented in FIG. 3C are here supplied by the computer represented at 28 and receiving inputs from the thickness-measuring unit 29.

In this case, of course, both lips can be deformed to increase the versatility of the thickness control. For each plus-field error detected, positive voltage is applied to the respective effector to radially contract the lip at this point (see FIG. 2B) and reduce the thickness. A negative-field error results in a negative electrical signal to the respective effector 11 to allow an increase in the thickness.

I claim:

1. A method of blowing a foil of a thermoplastic material, comprising the steps of:
    (a) extruding a tube of said thermoplastic material continuously from an annular nozzle orifice;
    (b) forming at least one annular wall of said orifice as an elastically deformable annular nozzle lip;
    (c) blowing the thermoplastic tube extruded from said orifice to expand said tube into a foil balloon;
    (d) flattening the foil balloon;
    (e) winding at least one layer of foil formed by flattening said foil balloon into a roll of said at least one layer;
    (f) measuring a thickness of said foil;
    (g) prestressing said lip in a radial direction; and
    (h) superimposing upon the radial prestress of said lip in step (g) a radial deformation of said lip in response to the measurement of thickness of said foil in step (f) at a multiplicity of locations around a periphery of said lip to correct a thickness of said tube and correct for thickness deviations of said foil.

2. The method defined in claim 1 wherein said lip defines an outer boundary of said orifice.

3. The method defined in claim 1 wherein said lip defines an inner boundary of said orifice.

4. A method of operating a film-blowing apparatus which comprises:
    providing an annular nozzle orifice through which a tube of a thermoplastic material is extruded continuously, blowing the thermoplastic tube extruded from said orifice to expand said tube into a foil balloon, flattening the foil balloon, and winding at least one layer of foil formed by flattening said foil balloon into a roll of said at least one layer, said method further comprising the steps of:
    (a) providing said orifice so that it is defined by at least one annular elastically deformable orifice lip;
    (b) providing in spaced relationship around aid orifice a multiplicity of positioning elements acting upon respective locations of said lip for substantially radially deforming said lip;
    (c) measuring a thickness of said foil;
    (d) prestressing said lip in a radial direction; and
    (e) superimposing upon the radial prestressing of said lip in step (d) a radial deformation by energizing said positioning elements in response to the measurement of the thickness of said foil to radially deform said lip selectively in response to the measurement of thickness of said foil selectively at said locations around a periphery of said lip to correct a thickness of said tube and correct for thickness deviations of said foil.

5. The method defined in claim 4 wherein said lip defines an outer boundary of said orifice.

6. The method defined in claim 4 wherein said lip defines an inner boundary of said orifice.

7. The method defined in claim 4 wherein said positioning elements are energized form element to element around said orifice.

8. The method defined in claim 4 wherein said elements are energized in a groupwise manner around said orifice.

9. The method defined in claim 4 wherein said elements are piezoelectric elements provided with a biasing voltage establishing said prestress and having a thickness-correction voltage superimposed in said biasing voltage.

10. The method defined in claim 4 wherein all of said elements are identical.

11. A foil-blowing apparatus comprising:
    an extruder formed with an annular nozzle orifice through which a tube of a thermoplastic material is extruded continuously;
    means for blowing said thermoplastic tube extruded from said orifice to expand said tube into a foil balloon;
    means for flattening the foil balloon;
    means for winding at least one layer of foil formed by flattening said foil balloon into a roll of said at least one layer, said orifice being defined by at least one annular elastically deformable orifice lip;
    a multiplicity of piezoelectric positioning elements in spaced relationship around said orifice acting upon respective locations of said lip having means for applying a bias voltage to said elements for radially deforming said lip;
    means for measuring a thickness of said foil; and
    means for generalizing said positioning elements by applying differing positive and negative variations to said voltage in response to the measurement of the thickness of said foil to superimpose upon the prestressing of the lip, a radial deformation of said lip selectively in response to the measurement of thickness of said foil selectively at said locations around a periphery of said lip to correct a thickness of said tube and correct for thickness deviations of said foil.

12. The apparatus defined in claim 11 wherein said means for energizing said elements includes a thickness error computer.

13. The apparatus define din claim 11 wherein said lip is formed on a side thereof turned away from said material, with a multiplicity of axial grooves imparting flexibility to said lip.

14. The apparatus defined in claim 11 wherein said variations are applied to individual positioning elements around said lip.

15. The apparatus defined in claim 11 wherein said variations are applied to groups of said elements around said lip.

* * * * *